(12) United States Patent
Hartwell et al.

(10) Patent No.: US 11,633,678 B2
(45) Date of Patent: *Apr. 25, 2023

(54) LIQUID QUALITY SYSTEM WITH DRAG-INDUCING PORTIONS

(71) Applicant: Advanced Drainage Systems, Inc., Hilliard, OH (US)

(72) Inventors: Erik Karl Hartwell, Mount Airy, MD (US); Bo Liu, Clarksburg, MD (US); Daniel John Figola, Powell, OH (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/317,226

(22) Filed: May 11, 2021

(65) Prior Publication Data

US 2022/0161157 A1    May 26, 2022

Related U.S. Application Data

(63) Continuation of application No. 17/103,576, filed on Nov. 24, 2020, now Pat. No. 11,033,835.

(51) Int. Cl.
| | | |
|---|---|---|
| *E03F 5/14* | (2006.01) | |
| *B01D 21/00* | (2006.01) | |
| *E03F 5/04* | (2006.01) | |
| *B01D 21/26* | (2006.01) | |

(52) U.S. Cl.
CPC ..... *B01D 21/0042* (2013.01); *B01D 21/0048* (2013.01); *B01D 21/0087* (2013.01); *B01D 21/265* (2013.01); *E03F 5/0403* (2013.01); *E03F 5/14* (2013.01); *B01D 2221/12* (2013.01)

(58) Field of Classification Search
CPC ............ B01D 21/0042; B01D 21/0087; B01D 21/265; E03F 5/0403; E03F 5/14; C02F 2103/001
USPC ..... 210/170.03, 519, 521, 532.1, 747.2, 801
See application file for complete search history.

(56) References Cited

U.S. PATENT DOCUMENTS

| | | |
|---|---|---|
| 5,849,181 A | 12/1998 | Monteith et al. |
| 6,068,765 A | 5/2000 | Monteith |
| 6,780,310 B1 | 8/2004 | Howe |
| 7,422,683 B2 | 9/2008 | Park |

(Continued)

FOREIGN PATENT DOCUMENTS

FR    1325639 A    5/1963

*Primary Examiner* — Christopher Upton
(74) *Attorney, Agent, or Firm* — Finnegan, Henderson, Farabow, Garrett & Dunner L.L.P

(57) ABSTRACT

The embodiments of the present disclosure provide a system for removing particulates from liquid. The system may comprise a base, a tubular body extending upwardly from the base, a liquid quality device located above the base, a sump region located between the base and the liquid quality device, and a plurality of drag-inducing portions positioned in the sump region and projecting inwardly toward a central axis of the sump region. The tubular body may comprise an inlet and an outlet. The plurality of drag-inducing portions may comprise a first set of drag-inducing portions, a second set of drag-inducing portions, a third set of drag-inducing portions, and a fourth set of drag-inducing portions. The first, second, third, and fourth sets of drag-inducing portions may be positioned equidistant from each other and at a same height around a perimeter of the sump region.

22 Claims, 18 Drawing Sheets

(56) References Cited

U.S. PATENT DOCUMENTS

| | | |
|---|---|---|
| 7,666,303 B2 | 2/2010 | Williams et al. |
| 8,865,006 B2 | 10/2014 | Ford |
| 10,639,568 B1 | 5/2020 | Carter |
| 11,033,835 B1 * | 6/2021 | Hartwell .................. E03F 5/14 |
| 2006/0163130 A1 | 7/2006 | Happel et al. |
| 2007/0012608 A1 | 1/2007 | Su et al. |
| 2011/0127204 A1 | 6/2011 | Andoh et al. |
| 2013/0264257 A1 | 10/2013 | Anderson |
| 2016/0160489 A1 | 6/2016 | Garbon et al. |
| 2017/0240438 A1 | 8/2017 | Babcanec et al. |
| 2018/0185770 A1 | 7/2018 | Garbon et al. |
| 2018/0245327 A1 | 8/2018 | Babcanec et al. |
| 2019/0153718 A1 | 5/2019 | Atchison et al. |
| 2019/0284790 A1 | 9/2019 | Babcanec et al. |
| 2020/0370290 A1 | 11/2020 | Yeoman et al. |

* cited by examiner

LIQUID QUALITY SYSTEM WITH DRAG-INDUCING PORTIONS

This application is a continuation of application Ser. No. 17/103,576, filed Nov. 24, 2020, now allowed, and claims the benefit of priority thereto. The above-cited Application is incorporated herein by reference in its entirety.

TECHNICAL FIELD

This disclosure relates generally to systems for removing particulates from liquid, and more particularly, to systems comprising a liquid quality device and a plurality of drag-inducing portions in a sump region for removing particulates from liquid.

BACKGROUND

Stormwater management systems are used to manage and treat stormwater, for example, by providing stormwater chambers in which sediment, debris, pollutants, or particulates may be removed from stormwater. As such, stormwater chambers may be provided underground where the chambers capture stormwater to separate and retain particulates until they are deposited in the ground or in an off-site location.

Often times, however, conventional stormwater management systems cannot prevent the flow of liquid, such as stormwater runoff, from flooding in the chambers. For example, when a stormwater chamber is filled with stormwater runoff, the systems may no longer be able to capture stormwater and retain particulates until they can be deposited in the ground or in an off-site location later. Accordingly, because conventional stormwater management systems run the risk of flooding, it is challenging for conventional stormwater management systems to reduce particulates from stormwater runoff and, ultimately, prevent particulates from reaching rivers, ponds, lakes, or the ocean.

Therefore, there is a need for improved systems for removing particulates from liquid, such as stormwater runoff, that are capable of reducing the risk of liquid flooding in the systems. There is also a need for improved systems for removing particulates from liquid that can reduce the risk of particulates escaping the systems.

SUMMARY

Embodiments of the present disclosure may include a system for removing particulates from liquid. The system may comprise a base, a tubular body extending upwardly from the base, a liquid quality device located above the base, a sump region located between the base and the liquid quality device, and a plurality of drag-inducing portions positioned in the sump region and projecting inwardly toward a central axis of the sump region. The tubular body may comprise an inlet and an outlet. In addition, the plurality of drag-inducing portions may comprise a first set of drag-inducing portions, a second set of drag-inducing portions, a third-set of drag-inducing portions, and a fourth set of drag-inducing portions. The first, second, third, and fourth sets of drag-inducing portions may be positioned equidistant from each other and at a same height around a perimeter of the sump region.

In some embodiments, the system may further comprise a plate positioned in the sump region between the liquid quality device and the plurality of drag-inducing portions. The plate may be attached to an internal surface of the tubular body and may project inwardly toward the central axis of the sump region. In some embodiments, the plate may project inwardly toward the central axis of the sump region such that the plate partially covers a horizontal, cross-sectional area of the sump region.

In other embodiments, the liquid quality device may further comprise a first region comprising a funnel with a sump inlet aperture, a second region comprising a sump outlet aperture, and a weir positioned between the first region and the second region. The system may further comprise a tube positioned below the sump inlet aperture. In some embodiments, the tube may extend downwardly from the sump inlet aperture into the sump region. In other embodiments, the first region may be configured to receive a flow of liquid from the inlet of the tubular body and transfer the flow of liquid through the sump inlet aperture of the funnel and into the sump region. Additionally, the second region may be configured to receive the flow of liquid from the sump region through the sump outlet aperture and transfer the flow of liquid to the outlet of the tubular body.

In some embodiments, at least one of the first, second, third, or fourth sets of drag-inducing portions may further comprise a first tooth, a second tooth located below the first tooth, and a third tooth located below the second tooth. In some embodiments, teeth of the first set of drag-inducing portions may be positioned in a different orientation than teeth of the second set of drag-inducing portions. In other embodiments, the first, second, third, and fourth sets of drag-inducing portions may be attached to respective supporting portions positioned proximate the tubular body in the sump region.

According to another embodiment of the present disclosure, a system for removing particulates from liquid is provided. The system may comprise a base, a tubular body extending upwardly from the base, a liquid quality device located above the base, a sump region located between the base and the liquid quality device, a plurality of drag-inducing portions positioned in the sump region and projecting inwardly toward a central axis of the sump region, a plate positioned in the sump region between the liquid quality device and the plurality of drag-inducing portions, and a tube positioned below the sump inlet aperture. The tubular body may comprise an inlet and an outlet. In addition, the liquid quality device may comprise a first region comprising a funnel with a sump inlet aperture, a second region comprising a sump outlet aperture, and a weir positioned between the first region and the second region. Additionally, the tube may extend downwardly from the sump inlet aperture into the sump region.

In some embodiments, the plurality of drag-inducing portions may comprise a first set of drag-inducing portions, a second set of drag-inducing portions, a third set of drag-inducing portions, and a fourth set of drag-inducing portions. The first, second, third, and fourth sets of drag-inducing portions may be positioned equidistant from each other and at a same height around a perimeter of the sump region. In some embodiments, at least one of the first, second, third, or fourth sets of drag-inducing portions may further comprise a first tooth, a second tooth located below the first tooth, and a third tooth located below the second tooth. In some embodiments, teeth of the first set of drag-inducing portions may be positioned in a different orientation than teeth of the second set of drag-inducing portions. In other embodiments, the first, second, third, and fourth sets of drag-inducing portions may be attached to respective supporting portions positioned proximate the tubular body in the sump region.

In some embodiments, the plate may project inwardly toward the central axis of the sump region such that the plate partially covers a horizontal, cross-sectional area of the sump region. In yet another embodiment, the first region may be configured to receive a flow of liquid from the inlet of the tubular body and transfer the flow of liquid through the sump inlet aperture of the funnel and into the sump region, and the second region may be configured to receive the flow of liquid from the sump region through the sump outlet aperture and transfer the flow of liquid to the outlet of the tubular body. In some embodiments, the tube may be configured to extend between about 2 inches and about 20 inches downwardly from the sump inlet aperture into the sump region.

According to yet another embodiment of the present disclosure, a system for removing particulates from liquid is provided. The system may comprise a base, a tubular body extending upwardly from the base, a liquid quality device located above the base, a sump region located between the base and the liquid quality device, a plurality of sets of drag-inducing portions positioned equidistant from each other and at a same height around a perimeter of the sump region, a plate positioned in the sump region between the liquid quality device and the plurality of sets of drag-inducing portions, and a tube positioned below the sump inlet aperture. The tubular body may comprise an inlet and an outlet. In addition, the tube may extend downwardly from the sump inlet aperture into the sump region. Additionally, the liquid quality device may comprise a first region comprising a funnel with a sump inlet aperture, a second region comprising a sump outlet aperture, and a weir positioned between the first region and the second region.

BRIEF DESCRIPTION OF THE DRAWINGS

The accompanying drawings, which are incorporated into and constitute a part of this specification, illustrate disclosed embodiments and, together with the description, serve to explain the disclosed embodiments.

DETAILED DESCRIPTION

Reference will now be made in detail to the present embodiments (exemplary embodiments) of the disclosure, examples of which are illustrated in the accompanying drawings.

As discussed in further detail below, various embodiments of a system for removing particulates from liquid, such as stormwater runoff, are provided. The system, consistent with the embodiments of the present disclosure, may be used to reduce particulates in liquid by inducing a vortex in the liquid, causing suspended particulates to settle on the outside of the vortex in a sump region of the system. Accordingly, the system may be able to separate the liquid from the particulates. However, if the velocity of the vortex is too great, the liquid flow may be every turbulent and the settled particulates may be mixed into the liquid again before exiting the system.

The exemplary system for removing particulates from liquid, consistent with the embodiments of the present disclosure, may be better adapted to remove particulates from liquid by reducing the speed of the vortex, directing the liquid flow away from the outlet of the system, subjecting the vortex to drag, thereby decreasing the velocities within the vortex, and/or reducing the lateral movement of the liquid flow. These techniques may improve the effectiveness of the system, as will be described in further detail below.

Figure 1:
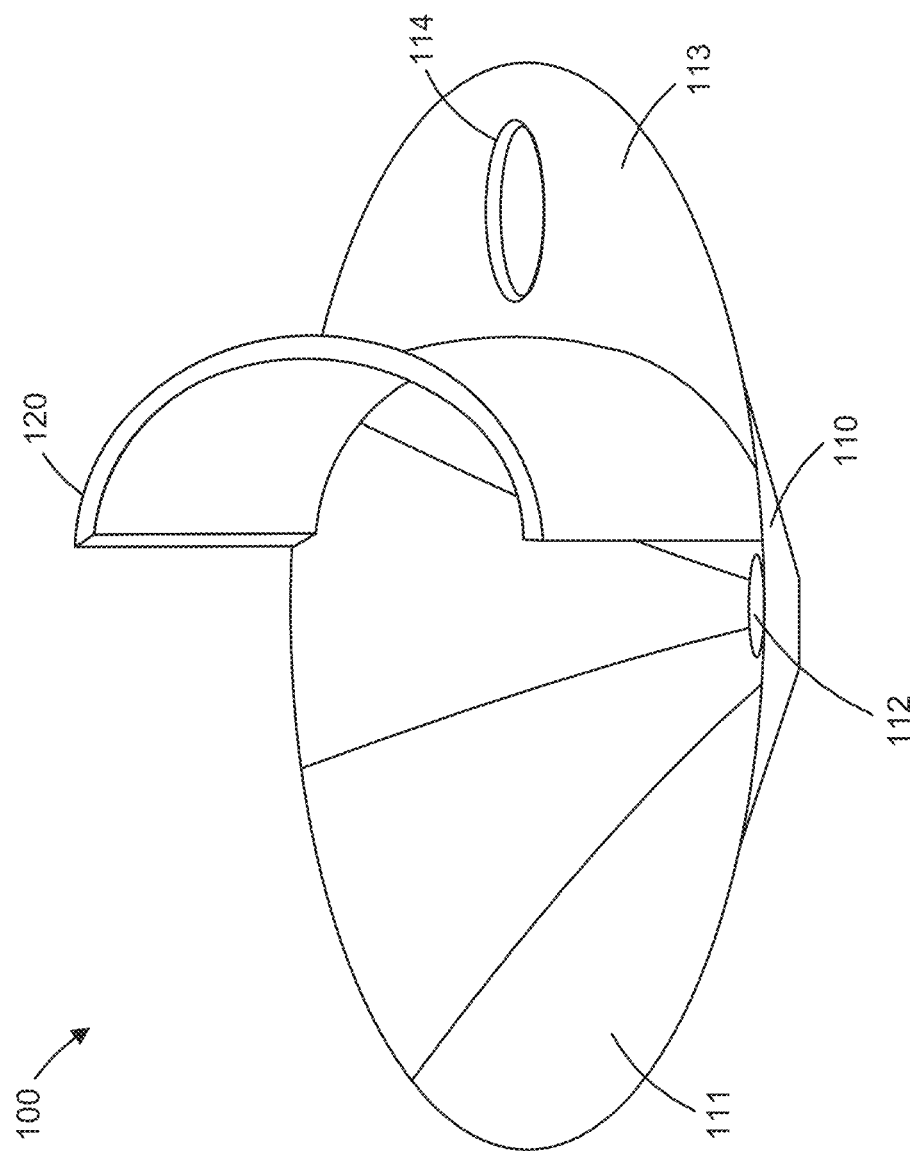
FIG. 1 is an illustration of a perspective view of an exemplary liquid quality device, consistent with the embodiments of the present disclosure.

Turning now to the drawings, FIG. 1 illustrates a perspective view of an exemplary liquid quality device 100, consistent with the embodiments of the present disclosure. The liquid quality device 100 may comprise a partitioning portion 110 and a weir 120. The portioning portion 110 may comprise a first region 111 and a second region 113, which may be separated by the weir 120. The components of the partitioning portion 110, such as the first region 111, the second region 113, and/or the weir 120, may be one integrated piece. In other embodiments, the components of the partitioning portion 110, such as the first region 111, the second region 113, and/or the weir 120, may be formed from separate pieces. The partitioning portion 110 and/or the weir 120 may be formed of a material, such as polyethylene, polypropylene, or other thermoplastics, or metals, such as stainless steel or aluminum, or fiberglass.

In some embodiments, the weir 120 may at least partially separate the first region 111 from the second region 113. As seen in FIG. 1, for example, the weir 120 may comprise a curvature along a horizontal dimension, which may be concave when viewed from the first region 111. The curvature of the weir 120 may be constant. In other embodiments, the curvature of the weir 120 may have a curve with a varying radius (as shown in FIG. 1). For example, the curvature of the weir 120 may have shorter radiuses at the edges and one or more longer radiuses in the center. Such a varying-radius design of the curvature of the weir 120 may facilitate the creation of a relatively smooth transition between the weir 120 and a sidewall of a tubular body of a system for removing particulates from liquid. The varying curvature may also assist in reducing turbulence, which may negatively impact the efficiency of the liquid quality device 100 to remove particulates from liquid. In other embodiments, the weir 120 may have no curvature. In yet another embodiment, the weir 120 may have a convex curvature when viewed from the first region 111.

In some embodiments, the first region 111 may comprise a funnel and a sump inlet aperture 112. The funnel may be configured to increase the length of time that the liquid flow remains in the funnel, and thus, in a vortex. Additionally or alternatively, the funnel may gradually decrease in radius as the liquid flows down the funnel. Accordingly, the funnel may be configured to maximize particulate separation. The second region 113 may comprise a sump outlet aperture 114. The second region 113 may also comprise a generally flat profile in the horizontal dimension. The sizes of the sump inlet aperture 112 and the sump outlet aperture 114 may be determined using the following equation:

$$Q = C_d A \sqrt{2gh}$$

where Q is the flow rate in cubic feet per second, A is the area of the respective aperture in square feet, g is the acceleration of gravity (32.2 ft/s$^2$), and h is the head in feet acting on the respective aperture.

Figure 2A:
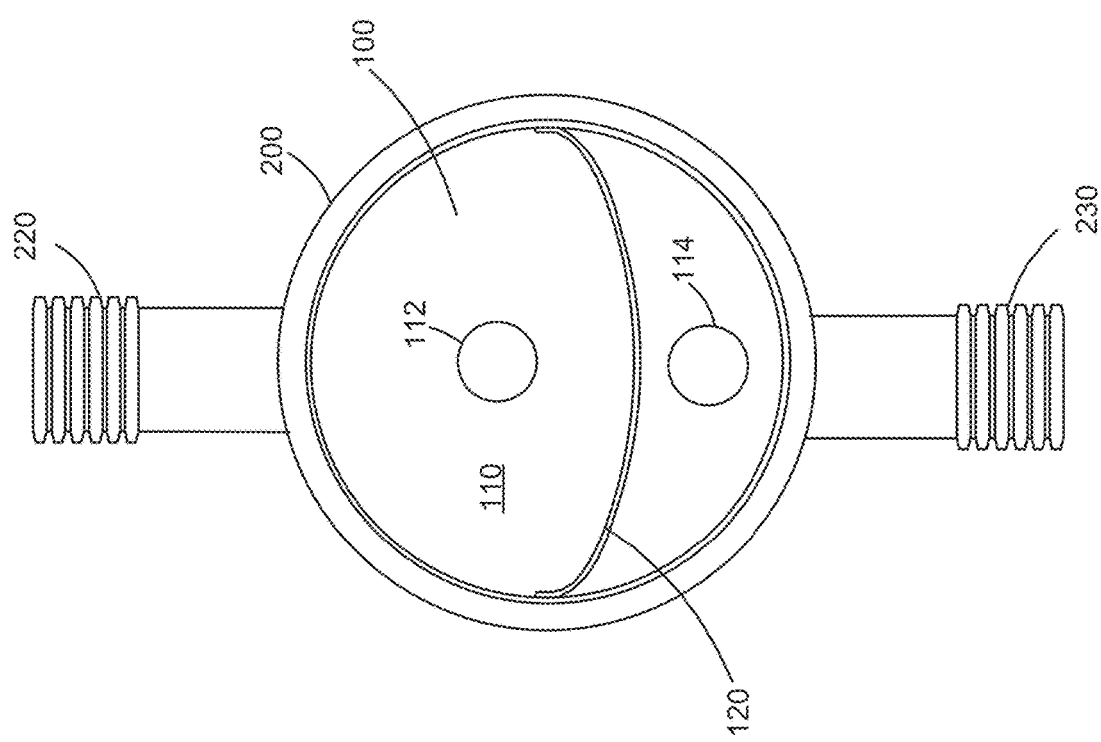
FIG. 2A is an illustration of a top view of an exemplary system with a liquid quality device, consistent with the embodiments of the present disclosure.
Figure 2B:
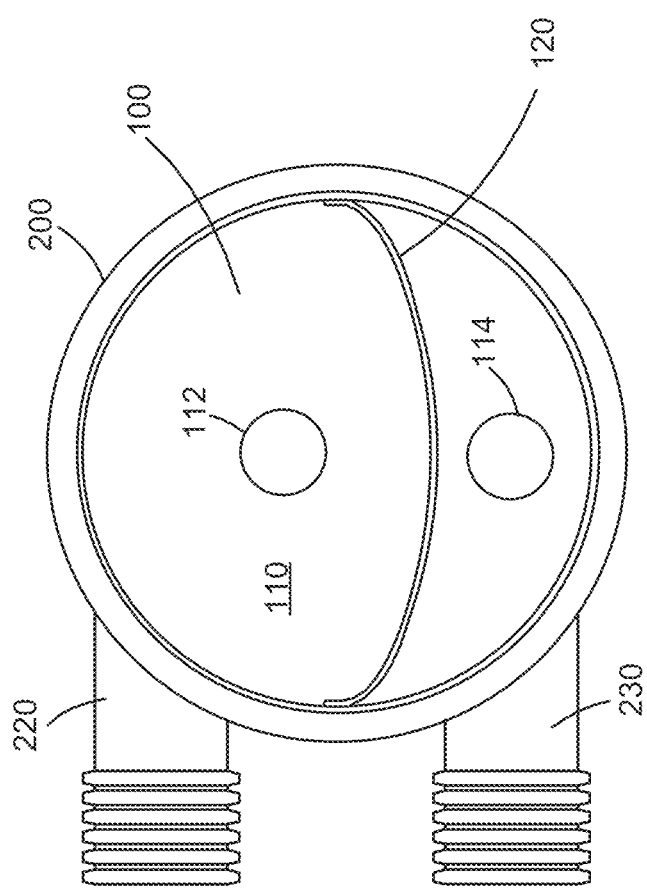
FIG. 2B is an illustration of a top view of another exemplary system with a liquid quality device, consistent with the embodiments of the present disclosure.
Figure 2C:
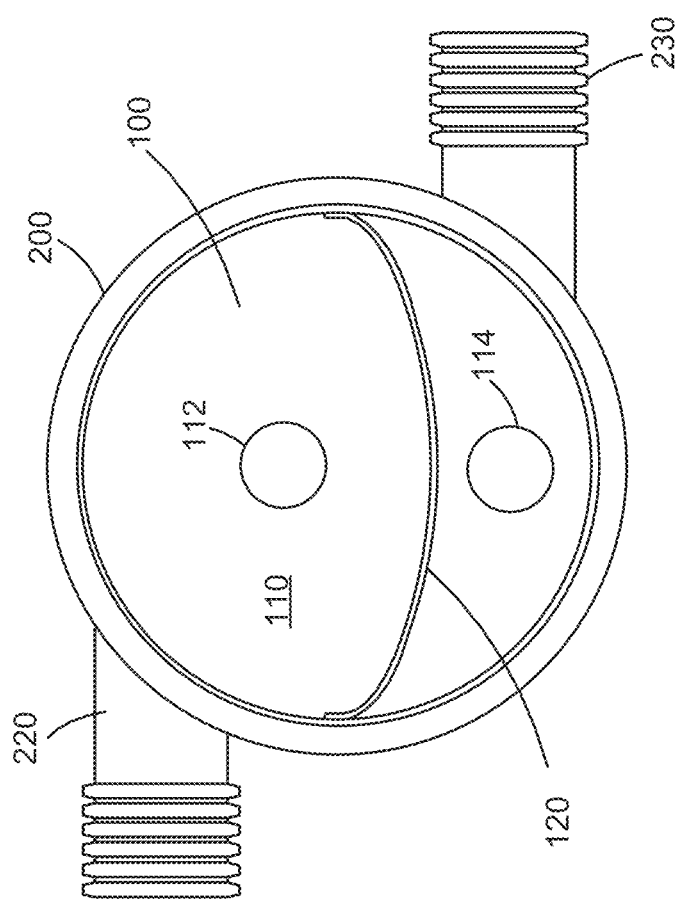
FIG. 2C is an illustration of a top view of another exemplary system with a liquid quality device, consistent with the embodiments of the present disclosure.

FIGS. 2A-2C illustrate a top view of various embodiments of an exemplary system 200 comprising the liquid quality device 100 of FIG. 1, consistent with the embodiments of the present disclosure. System 200 may comprise a base 210 (shown in FIG. 4), an inlet 220, and an outlet 230. In some embodiments, the base 210, the inlet 220, and/or the outlet 230 may be integrated into the body of system 200. In other embodiments, the base 210, the inlet 220, and/or the outlet 230 may be formed of separate pieces that may be coupled to each other to form system 200.

Referring to FIG. 2A, when liquid, such as stormwater runoff, enters system 200, the liquid may enter system 200 on one side through the inlet 220 and flow through the sump inlet aperture 112 into a sump region. Then, the liquid may flow from the sump region through the sump outlet aperture 114 and exit system 200 on an opposite side through the outlet 230. In other embodiments, liquid may enter and exit system 200 on the same side. For example, referring to FIG. 2B, the liquid may enter system 200 on one side through the inlet 220 and flow through the sump inlet aperture 112 into a sump region. Then, the liquid may flow from the sump region through the sump outlet aperture 114 and exit system 200 on the same side through the outlet 230. In yet another embodiment, the inlet 220 and the outlet 230 may be located on opposite sides of system 200 and may be offset relative to each other in a horizontal direction. For example, referring to FIG. 2C, the inlet 220 and the outlet 230 may be offset relative to each other in a horizontal direction, as compared to the positions of the inlet 220 and the outlet 230 in FIG. 2A. Other arrangements of the inlet 220 and the outlet 230 may be possible. For example, the inlet 220 and the outlet 230 may be positioned at right angles or oblique angles relative to each other.

Figure 3:
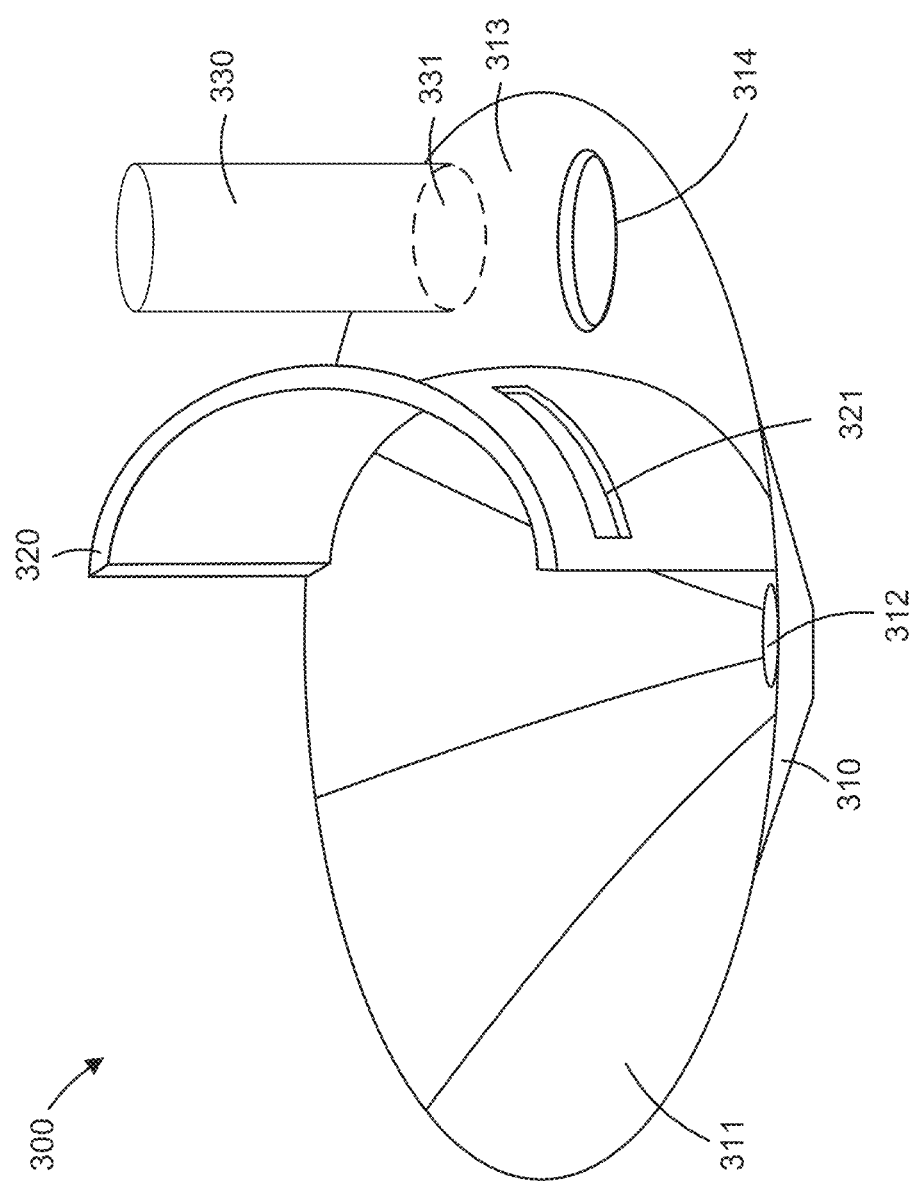
FIG. 3 is an illustration of another exemplary liquid quality device, consistent with the embodiments of the present disclosure.

FIG. 3 illustrates another exemplary liquid quality device 300, consistent with the embodiments of the present disclosure. The liquid quality device 300 may comprise a partitioning portion 310 and a weir 320. The portioning portion 310 may comprise a first region 311 and a second region 313, which may be separated by the weir 320. In some embodiments, the weir 320 may at least partially (or completely) separate the first region 311 from the second region 313. The first region 311 may comprise a funnel and a sump inlet aperture 312, and the second region 313 may comprise a sump outlet aperture 314. In some embodiments, the second region 313 may comprise a generally flat profile in the horizontal dimension.

In some embodiments, the first region 311, the second region 313, and/or the weir 320 may be integrated into one piece. In other embodiments, the first region 311, the second region 313, and/or the weir 320 may be formed of separate pieces and coupled to each other to form the liquid quality device 300. In some embodiments, the liquid quality device 300 may further comprise a clean-out riser pipe 330 extending upwardly from an additional aperture 331 in the second region 313. In some embodiments, a vacuum may be applied through the clean-out riser pipe 730 in order to remove settled particulates in a sump region, such as sump region 240 in FIG. 4.

In other embodiments, the weir 320 may comprise an aperture 321. Aperture 321 may be sized and positioned to allow an increased flow rate that falls between a design treatment flow rate and an ultimate flow rate (approximately 3× the design treatment flow rate) to pass through the aperture 321 without overtopping the entire weir 320. The design treatment flow rate may be the flow rate of liquid that is intended to pass through the unit and receive treatment for the removal of particulates. The ultimate flow rate may be the total flow rate of the liquid that can pass through the unit without overflowing from the system. By preventing the liquid flow from overtopping the weir 320, the liquid quality device 300 may be able to assist in containing large debris and forcing large debris into the sump region. It is noted, however, that as the flow rates in the liquid quality device 300 approach the ultimate flow rate, some additional liquid volume in the liquid quality device 300 may overtop the weir 320 and exit the liquid quality device 300. At this point, however, the liquid may be typically considered to have substantially reduced levels of particulates therein. Therefore, there may be no need for treatment of the liquid at this point. In addition, by allowing the liquid flow to overtop the weir 320 at a particular point, the liquid quality device 300 may be capable of reducing velocities in the sump region, which in turn may help to reduce the re-suspension of previously collected particulates.

FIGS. 4-8 illustrate a system 400 comprising a base 210, a tubular body 480 extending upwardly from the base 210, a liquid quality device 401, and a sump region 240 between the base 210 and the liquid quality device 410. The liquid quality device 401 may comprise a partitioning portion 410 and a weir 420. The partitioning portion 410 may comprise a first region 411 and a second region 413, which may be separated by weir 420. As discussed above, the system 400 may comprise a tubular body 480. The tubular body 480 may extend upwardly from the base 210 of system 400 and may comprise an inlet 220 and an outlet 230.

In some embodiments, the system 400 may comprise a central vertical axis that runs the primary length of the system 400 through the sump region 240. The system 400 may further comprise at least one drag-inducing portion 450 and at least one supporting portion 460. In some embodiments, the at least one drag-inducing portion 450 may be attached to the at least one supporting portion 460. In other embodiments, the at least one drag-inducing portion 450 and the at least one supporting portion 460 may be integrated into once piece. The at least one drag-inducing portion 450 may assist in reducing the liquid flow velocity and turbulence in the vortex that may develop in the sump region 240. Accordingly, the at least one drag-inducing portion 450 may prevent settled particulates from mixing back up into the liquid, thereby improving the effectiveness of the system 400 in removing particulates from the liquid.

The at least one drag-inducing portion 450 may require a particular flow rate to begin affecting the flow of the liquid in the sump region 240. For example, at lower flow rates, the funnel may create a vortex in the liquid in the first region 411, causing liquid to flow through the sump inlet aperture 412 and flow straight down into the sump region 240. As the flow rate increases, the rotational energy of the liquid may also increase. Therefore, at higher flow rates, the vortex created in the liquid induced by the funnel in the first region 411 may have sufficient rotational energy to create a vortex in the liquid in the sump region 240 after the liquid passes through the sump inlet aperture 412. Such a vortex in the sump region 240 may have strong turbulence, and the liquid flow velocity and/or the turbulence of the vortex in the sump region 240 may increase as the flow rate increases. As a result of a relatively high flow rate, the turbulent vortex may pick up already settled particulates from the floor of the sump region 240. In addition to a relatively high liquid flow velocity, liquid turbulence within the vortex may affect the behavior of the liquid flow and may also influence the settling characteristics of particulates in the flow. For example, the greater the liquid turbulence and liquid flow velocity in the sump region 240, the more difficult it may be for particulates to settle, and the easier it may be for particulates to be re-suspended into the liquid. Therefore, it may be desirable to create a longer, more laminar flow path to increase the amount of time during which liquid remains in the sump region 240, thereby providing sufficient time for particulates to settle at the base 210. In some embodiments, system 400 may reduce resuspension of settled particulates in the sump region 240 by transforming the turbulent flow of the vortex into a controlled and increasingly laminar flow. In order to create a longer, more laminar flow path, system 400 may force the liquid to make smooth direction changes as the liquid moves around the sump region 240 in the vortex. Additionally or alternatively, system 400 may guide the liquid flow away from the sump outlet aperture 414 to increase the amount of time that liquid remains in the sump region 240.

Figure 4:
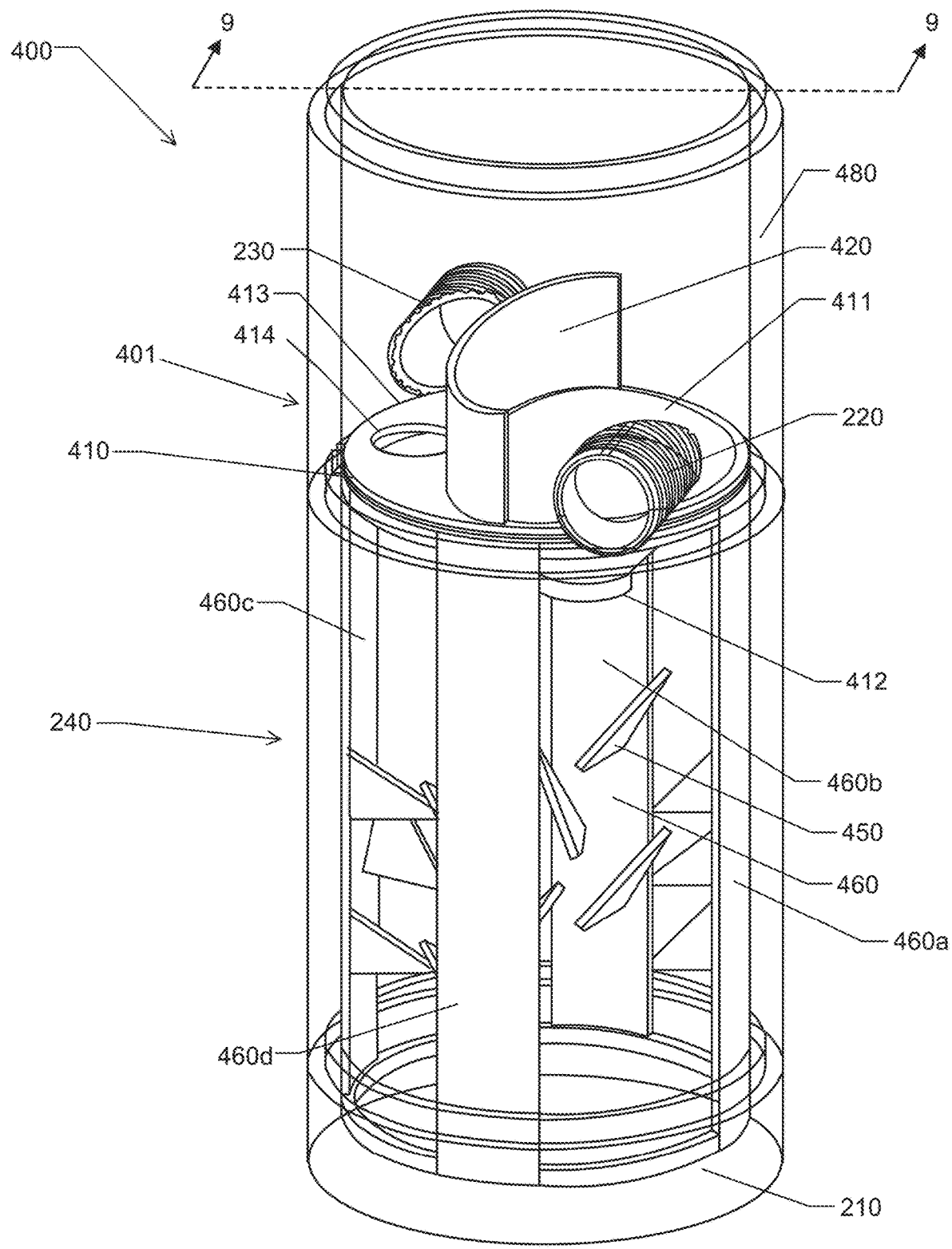
FIG. 4 is an illustration of a perspective view of an exemplary system with a plurality of drag-inducing portions, consistent with the embodiments of the present disclosure.
Figure 5:
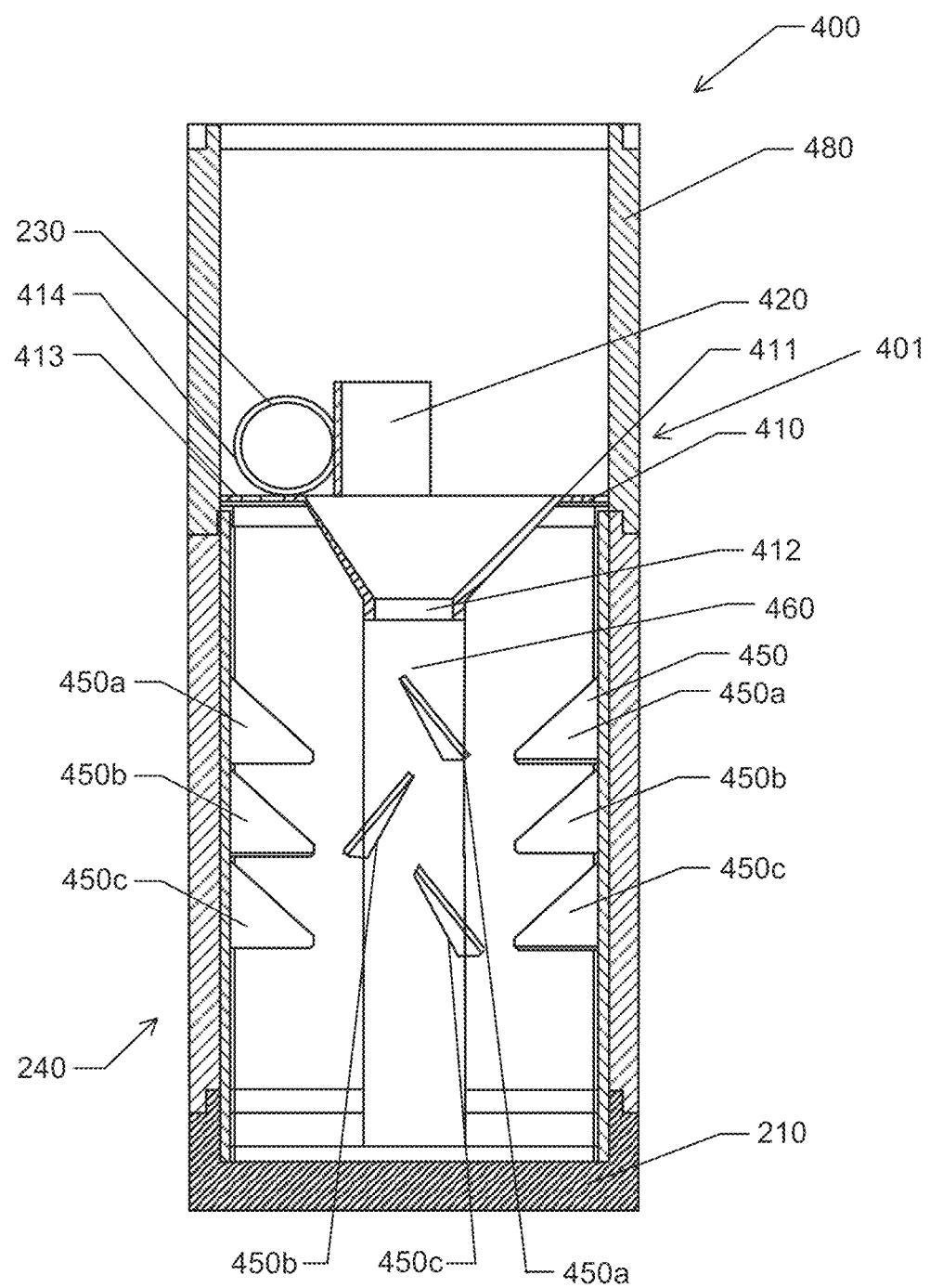
FIG. 5 is an illustration of a cross-sectional view of the exemplary system of FIG. 4 taken along line 9-9, consistent with the embodiments of the present disclosure.
Figure 6:
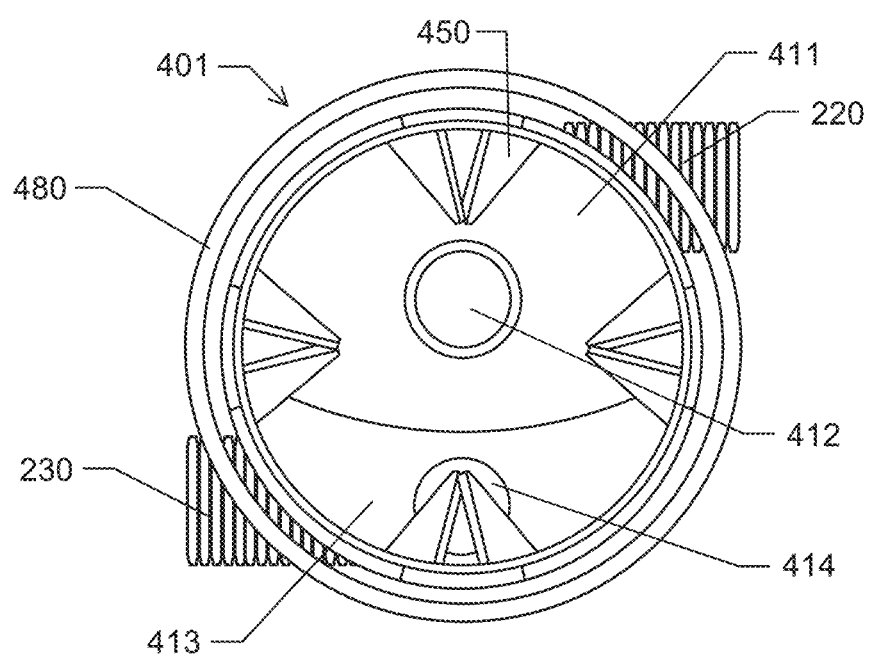
FIG. 6 is an illustration of a bottom view of the exemplary system of FIG. 4, consistent with the embodiments of the present disclosure.

In some embodiments, as seen in FIGS. 4-6, the drag-inducing portions 450 may project inwardly towards the central axis of the system 400 and may be positioned proximate a sidewall of tubular body 480 in the sump region 240. For example, the drag-inducing portions 450 may be positioned proximate to or on the sidewall of the tubular body 480 in the sump region 240. The drag-inducing portion) 450 may create drag to slow the liquid flow velocities in the vortex, extend the flow path by forcing a smooth direction change, and/or guide liquid away from the sump outlet aperture 414. In some embodiments, the orientation and angle of the at least one drag-inducing portion 450 may be adjustable.

In other embodiments, the at least one drag-inducing portion 450 may comprise a solid or a hollow body and may be configured to displace some volume of the liquid in the sump region 240. For example, when liquid flow passes by the body of the at least one drag-inducing portion 450, the liquid in the flow may be displaced by the body of the at least one drag-inducing portion 450 and, as a result, a boundary layer may form along the surface of the at least one drag-inducing portion 450. The boundary layer may result in the liquid changing in viscosity and becoming more dense, thereby directing the liquid downstream until the flow separates. Such displacement of the liquid flow path may facilitate the settling of particulates by allowing the particulates to be knocked out of the vortex flow.

In some embodiments, a plurality of drag-inducing portions 450 may be positioned in the sump region 240 in order to reduce the liquid flow velocity in the vortex and alter the flow path of liquid even more. In some embodiments, the drag-inducing portions 450 may be attached to at least one supporting portion 460, which may in turn be attached to the sidewall of the sump region 240. In some embodiments, for example, the drag-inducing portions 450 may be attached to the at least one supporting portion 460 by an adhesive, a screw, or a bolt. In other embodiments, the drag-inducing portions 450 and the at least one supporting portion 460 may be integrated and formed in a single piece. Similarly, the at least one supporting portion 460 may be attached to the sidewall of the sump region 240 by an adhesive, a screw, or a bolt. In other embodiments, the at least one supporting portion 460 and the sidewall of the sump region 240 may be integrated and formed in a single piece. In yet another embodiment, the drag-inducing portions 450 may be directly attached to the sidewall of the sump region 240 without the supporting portion 460.

Figure 14A:
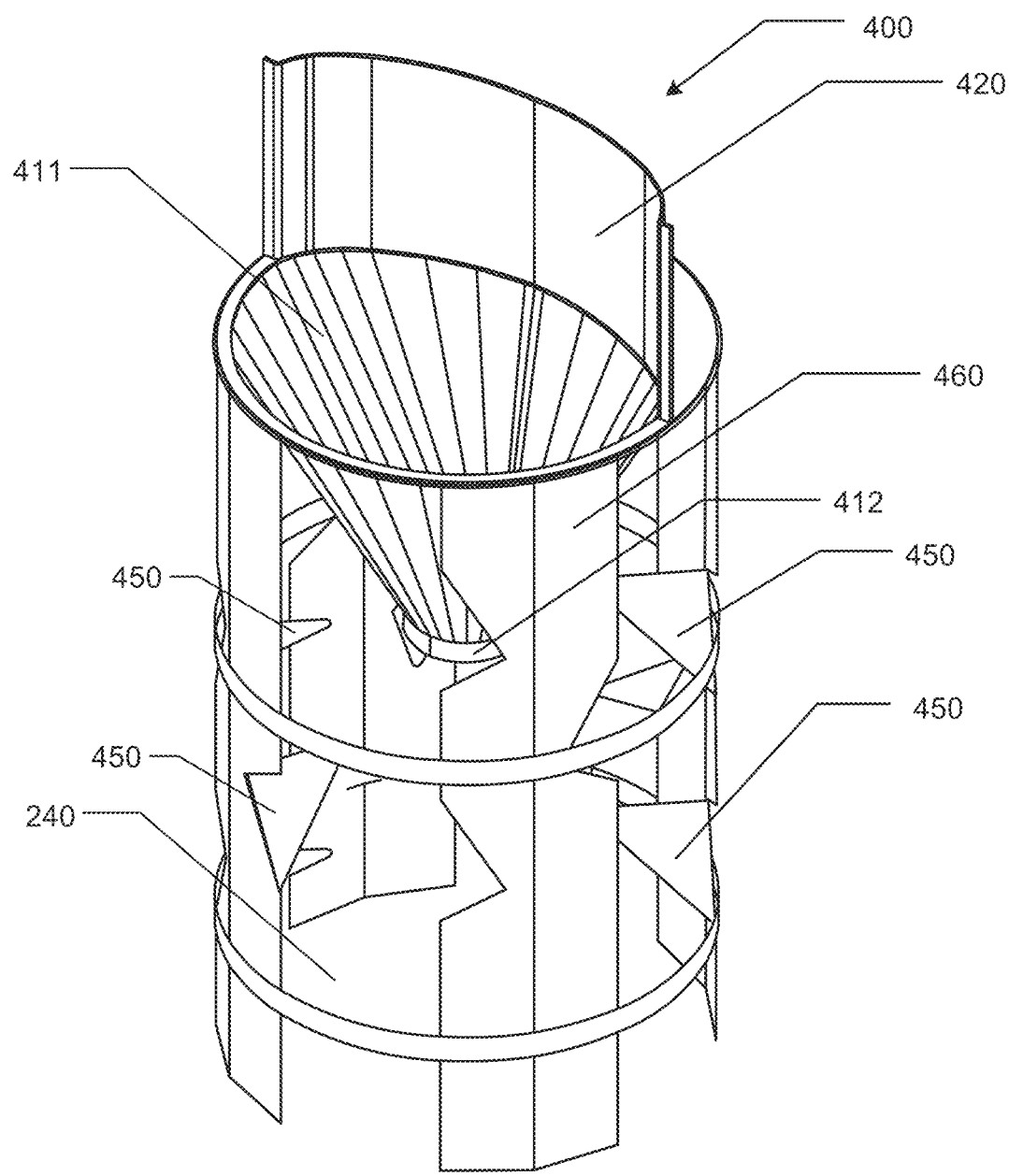
FIG. 14A is an illustration of a front perspective view of another exemplary system, consistent with the embodiments of the present disclosure.
Figure 14B:
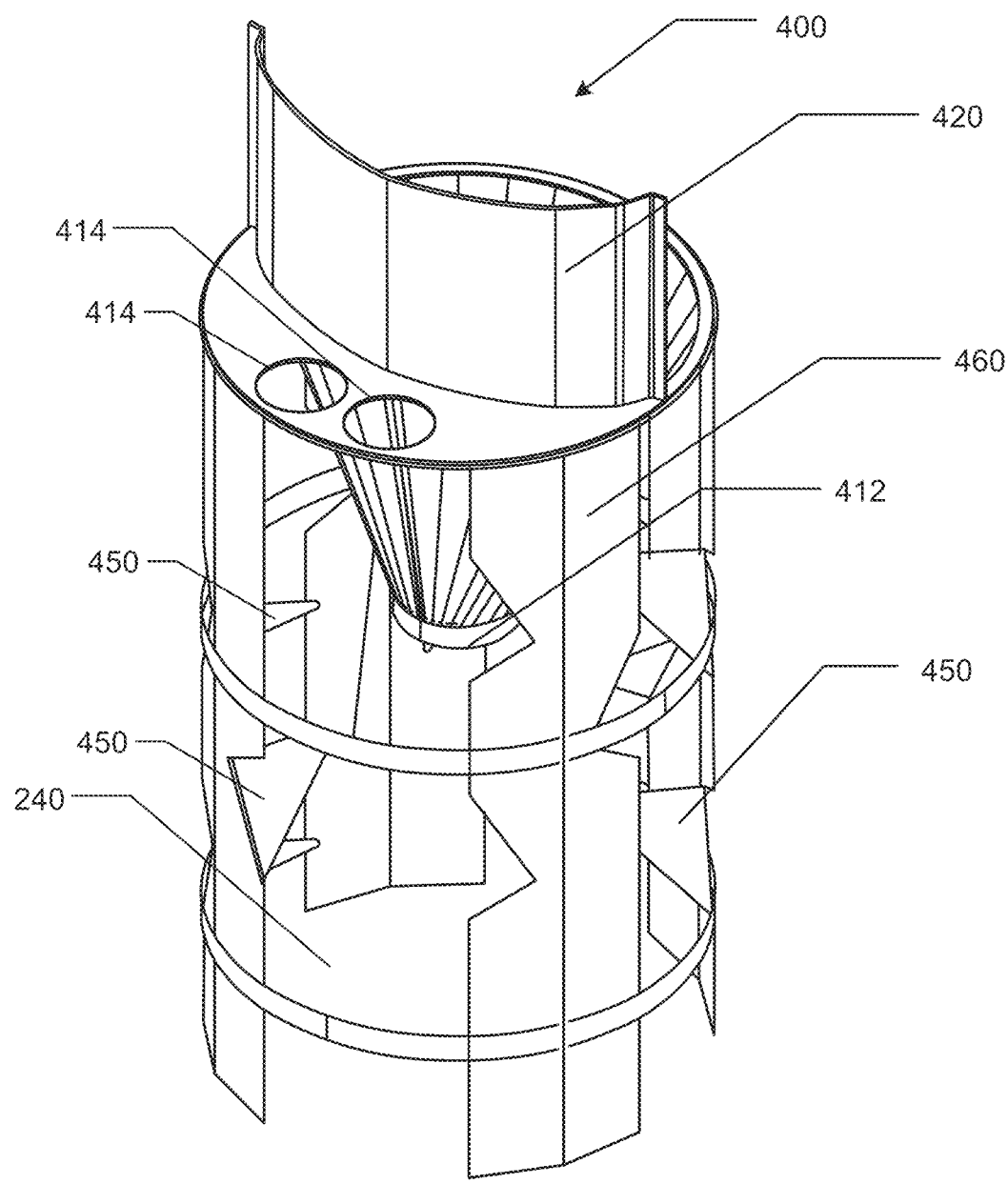
FIG. 14B is a rear perspective view of the exemplary system of FIG. 14A.

By way of example, FIGS. 14A and 14B illustrate perspective views of an exemplary embodiment of system 400 comprising a funnel in the first region 411, a weir 420, a plurality of drag-inducing portions 450, and a plurality of supporting portions 460. In FIGS. 14A and 14B, the funnel in the first region 411, the weir 420, the plurality of drag-inducing portions 450, and the plurality of supporting portions 460 may be integrated and formed in a single piece to form the system 400. In some embodiments, the funnel in the first region 411, the weir 420, the plurality of drag-inducing portions 450, and the plurality of supporting portions 460 may be formed of a material, such as polyethylene, polypropylene, or other thermoplastics, or metals, such as stainless steel or aluminum, or fiberglass. Additionally or alternatively, the funnel in the first region 411, the weir 420, the plurality of drag-inducing portions 450, and the plurality of supporting portions 460 may be welded together to form the system 400. In other embodiments, the system 400 may comprise a plurality of sump outlet apertures 414 to guide the liquid flow out of the sump region 240. For example, as seen in FIG. 14B, the system 400 may comprise two sump outlet apertures 414 to guide the liquid flow out of the sump region 240.

Figure 15:
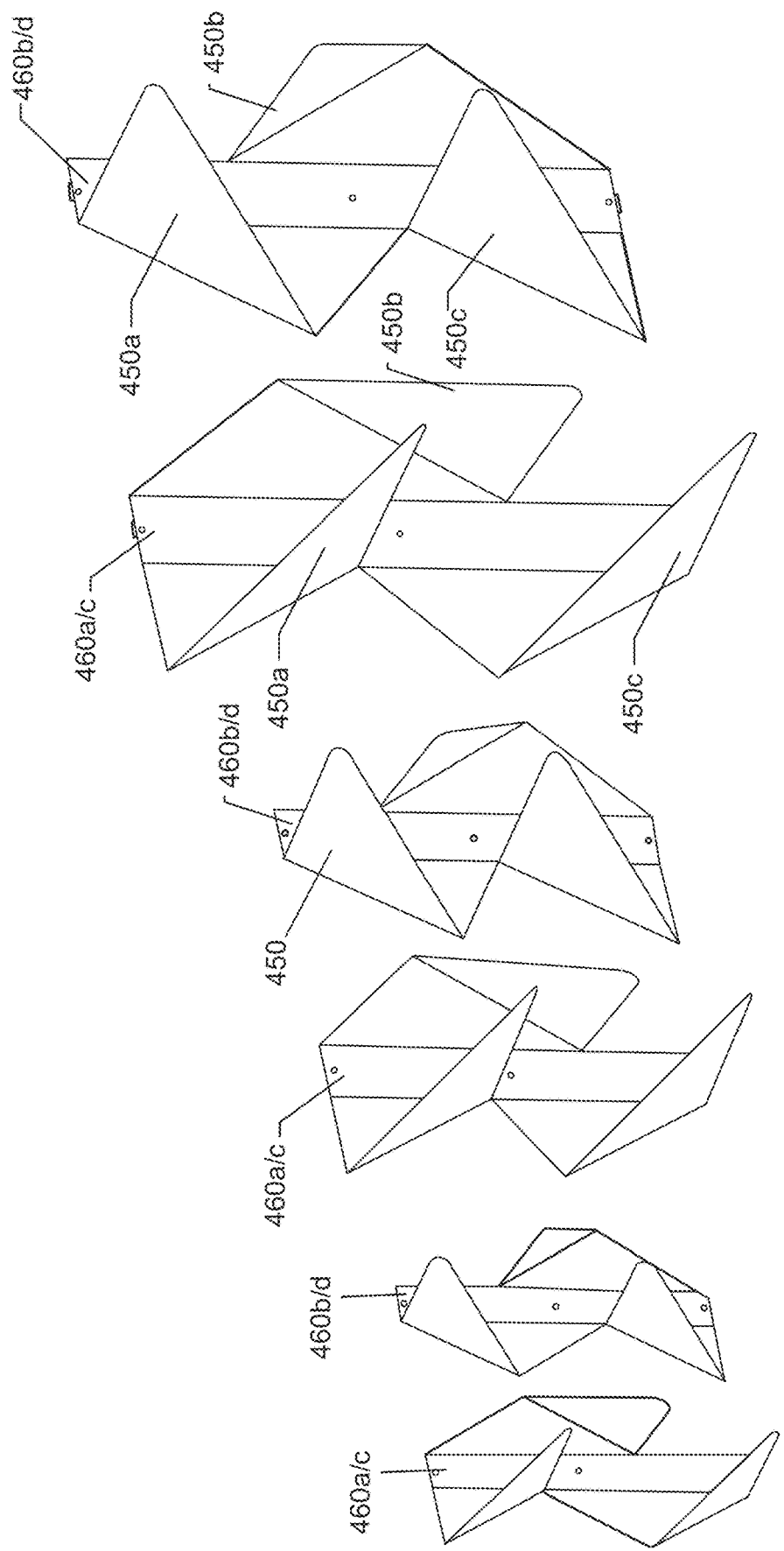
FIG. 15 is an illustration of exemplary drag-inducing portions, consistent with the embodiments of the present disclosure.

In some embodiments, the plurality of drag-inducing portions 450 may be made from a single sheet of material, and thus, integrated and formed into a single piece. For example, as shown in FIG. 15, each set of drag-inducing portions 450a, 450b, and 450c may be made from a single sheet of material, such as polyethylene, polypropylene, or other thermoplastics, or metals, such as stainless steel or aluminum, or fiberglass. In some embodiments, each set of drag-inducing portions 450a, 450b, and 450c, as well as the supporting portion 460a/c or 460b/d on which each set of drag-inducing portions 450a, 450b, and 450c are coupled, may be formed from a single piece of material, and thus, integrated into one piece. As seen in FIG. 15, in some embodiments, one or more of the sets of drag-inducing portions 450 may be adjusted in size and one or more of the supporting portions 460a/c and 460b/d may be adjusted in length based on a diameter of the system for removing particulates from liquid.

In some embodiments, the drag-inducing portions 450 may comprise one or more triangular-shaped teeth. For example, as used herein, "tooth" or "teeth" may refer to individual drag-inducing portions 450. The terms "tooth" and "teeth" are not limited to triangular shapes. For example, the drag-inducing portions 450 may comprise teeth of other geometrical shapes, including but not limited to, rectangles, squares, ovals, circles, or other various polygons. In some embodiments, the at least one supporting portion 460 may comprise vertical strips that may be positioned between the partitioning portion 410 and the base 210 proximate the sidewall of the tubular body 480 in the sump region 240. In some embodiments, the plurality of supporting portions 460 may be spaced equidistant around a perimeter of the sump region 240 such that sets of drag-inducing portions 450 may be positioned equidistant around a perimeter of the sump region 240. Additionally or alternatively, the plurality of supporting portions 460 may be positioned irregularly around the perimeter of the sump region 240.

As shown in FIG. 4, system 400 may comprise a plurality of drag-inducing portions 450. For example, system 400 may comprise a plurality of sets of drag-inducing portions, such as a first set of drag-inducing portions, a second set of drag-inducing portions, a third set of drag-inducing portions, and a fourth set of drag-inducing portions. The first, second, third, and fourth sets of drag-inducing portions may be positioned equidistant from each other and at a same height around a perimeter of the sump region. In some embodiments, system 400 may comprise any number of sets of drag-inducing portions, such as one to ten sets of drag-inducing portions. As seen in FIG. 5, each set of drag-inducing portions may comprise a first drag-inducing portion 450a, a second drag-inducing portion 450b, and a third drag-inducing portion 450c, each of which may project inwardly toward the central axis and may be positioned proximate the sidewall of the tubular body 480 in the sump region 240. Each of the first drag-inducing portion 450a, the second drag-inducing portion 450b, and the third drag-inducing portion 450c may be referred to as a tooth. The first drag-inducing portion 450a, the second drag-inducing portion 450b, and the third drag-inducing portion 450c may make up one set of drag-inducing portions 450. Therefore, as shown in FIGS. 4 and 6, for example, system 400 may comprise four sets of drag-inducing portions 450 respectively attached to a first supporting portion 460a, a second supporting portion 460b, a third supporting portion 460c, and a fourth supporting portion 460d.

As seen in FIG. 4, supporting portions 460a, 460b, 460c, and 460d may be positioned equidistant around the perimeter of the sump region 240. In some embodiments, the vertical positioning of drag-inducing portions 450a, 450b, and 450c may be generally central on each of the supporting portions 460a, 460b, 460c, and 460d. Additionally or alternatively, each set of drag-inducing portions 450a, 450b, and 450c may be positioned at a same height around a perimeter of the sump region, thereby simplifying the process of installing drag-inducing portions 450 on the supporting portions 460 and/or the sidewall of the sump region 240. For example, each drag-inducing portion 450a positioned around the perimeter of the sump region 240 may be positioned at the same height, each drag-inducing portion 450b positioned around the perimeter of the sump region 240 may be positioned at the same height, and each drag-inducing portion 450c positioned around the perimeter of the sump region 240 may be positioned at the same height.

In other embodiments, supporting portions 460a and 460c may have a different configuration of drag-inducing portions 450a, 450b, and 450c than supporting portions 460b and 460d. For example, the supporting portions 460a and 460c may face each other and have a first configuration and orientation of drag-inducing portions 450a, 450b, and 450c, while supporting portions 460b and 460d may face each other and have a second, different configuration and orientation of drag-inducing portions 450a, 450b, and 450c.

Figure 7:
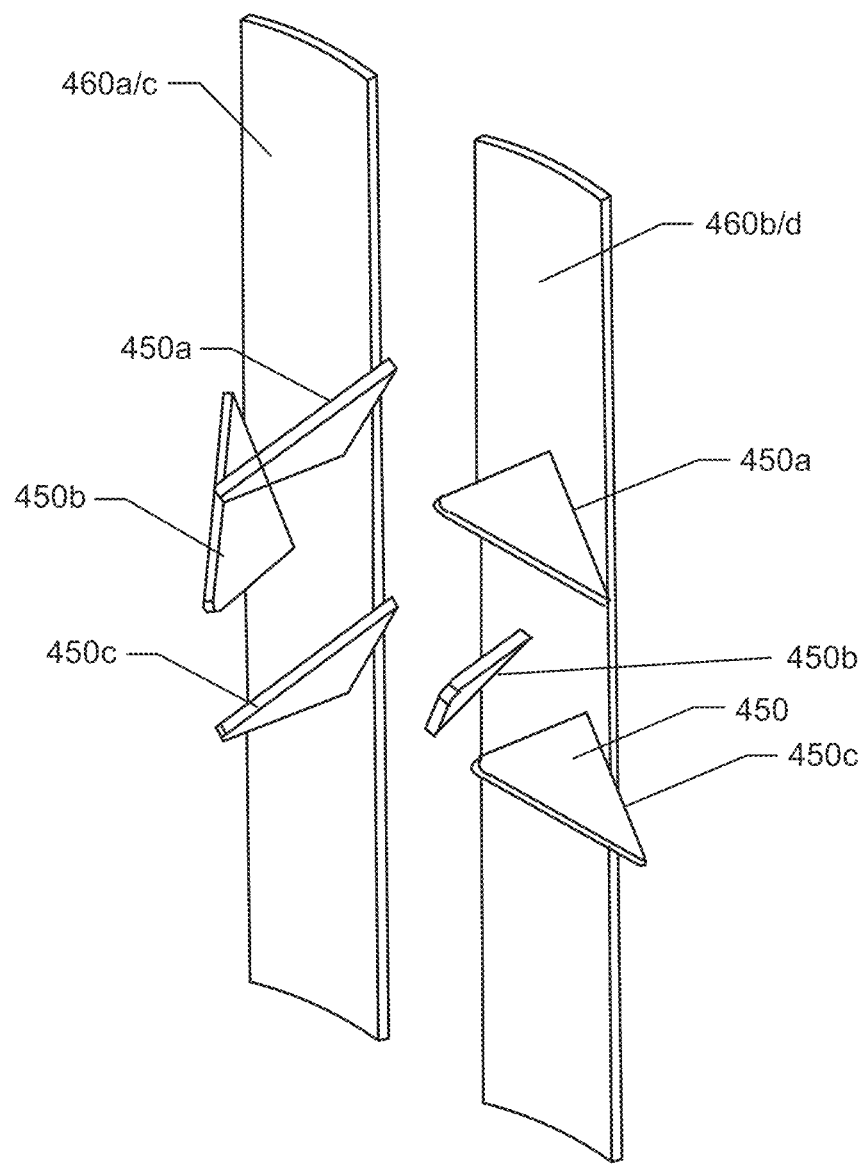
FIG. 7 is an illustration of a perspective view of a plurality of drag-inducing portions, consistent with the embodiments of the present disclosure.
Figure 8:
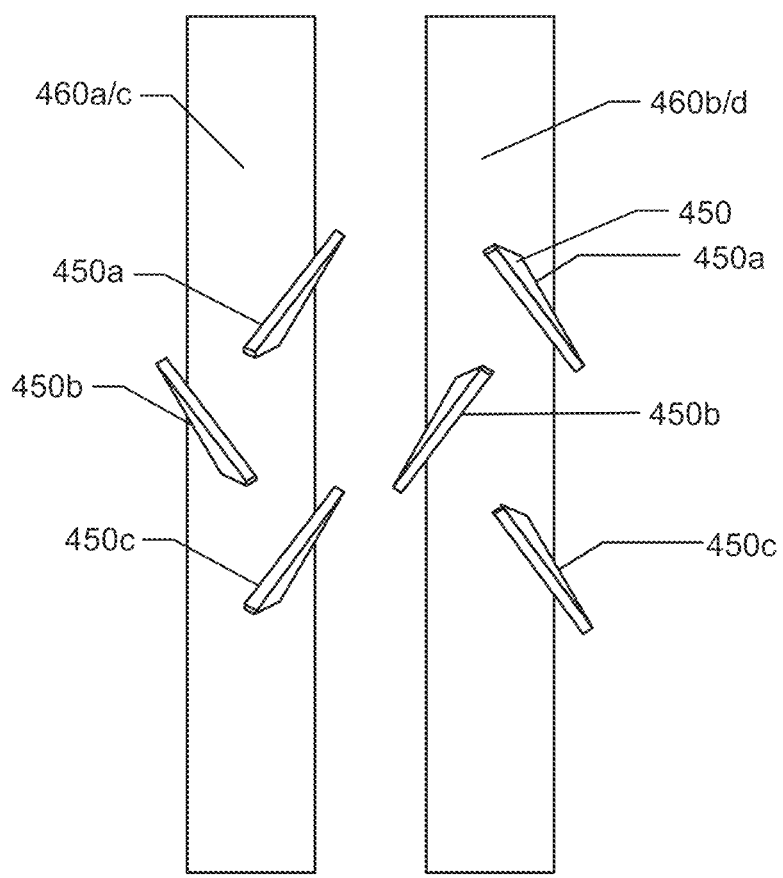
FIG. 8 is an illustration of a front view of the plurality of drag-inducing portions of FIG. 7, consistent with the embodiments of the present disclosure.

FIGS. 7 and 8 illustrate a first configuration and a second configuration of a plurality of drag-inducing portions 450, consistent with the embodiments of the present disclosure. As seen in FIGS. 7 and 8, in the first configuration, the drag-inducing portions 450a, 450b, and 450c may be equidistantly vertically positioned along a primary axial dimension of respective supporting portions 460a, 460c. In other embodiments, the drag-inducing portions 450a, 450b, and 450c may be irregularly vertically positioned along a primary axial dimension. As seen in FIGS. 7 and 8, in the first configuration, the drag-inducing portions 450a, 450b, and 450c may each be oriented upwardly. The first drag-inducing portion 450a and the third drag-inducing portion 450c may be oriented in the same direction, while the second drag-inducing portion 450b is oriented in a different direction. For example, the first drag-inducing portion 450a and the third drag-inducing portion 450c may be angled 60° from a horizontal plane, while the second drag-inducing portion 450b may have a mirrored orientation from the first drag-inducing portion 450a and the third drag-inducing portion 450c. That is, the second drag-inducing portion 450b may be angled 120° from the horizontal plane. The first, second, and third drag-inducing portions 450a, 450b, and 450c may be oriented at other various angles from the horizontal plane in the first configuration.

In the second configuration, the drag-inducing portions 450a, 450b, and 450c may be equidistantly vertically positioned along a primary axial dimension of respective supporting portions 460b, 460d. In other embodiments, the drag-inducing portions 450a, 450b, and 450c may be irregularly vertically positioned along a primary axial dimension. As seen in FIGS. 7 and 8, in the second configuration, the drag-inducing portions 450a, 450b, and 450c may each be oriented downwardly. The first drag-inducing portion 450a and the third drag-inducing portion 450c may be oriented in the same direction, while the second drag-inducing portion 450b is oriented in a different direction. For example, the first drag-inducing portion 450a and the third drag-inducing portion 450c may be angled −60° from a horizontal plane, while the second drag-inducing portion 450b may have a mirrored orientation from the first drag-inducing portion 450a and the third drag-inducing portion 450c. That is, the second drag-inducing portion 450b may be angled −120° from the horizontal plane. The first, second, and third drag-inducing portions 450a, 450b, and 450c may be oriented at other various angles from the horizontal plane in the second configuration.

The drag-inducing portions 450a, 450b, and 450c in the first configuration may be respectively at the same height as the drag-inducing portions 450a, 450b, and 450c in the second configuration along the primary axial dimension. For example, as shown in FIG. 8, the first drag-inducing portion 450a in the first configuration on supporting portion 460a or 460c may be at the same height as the first drag-inducing portion 450a in the second configuration on supporting portion 460b or 460d along a primary axial dimension. In addition, the second drag-inducing portion 450b in the first configuration on supporting portion 460a or 460c may be at the same height as the second drag-inducing portion 450b in the second configuration on supporting portion 460b or 460d. Similarly, the third drag-inducing portion 450c in the first configuration on supporting portion 460a or 460c may be at the same height as the third drag-inducing portion 450c in the second configuration on supporting portion 460b or 460d.

The angular position of the drag-inducing portions 450a, 450b, and 450c may be based on the principles of Stoke's Law and "inclined plate settling" techniques. For example, in the embodiment in which the drag-inducing portions 450 are positioned at +60° or −60°, the positioning of the drag-inducing portions 450 may help facilitate particulate settling. An angular positioning of +60° or −60° may also allow particulates to slide down the drag-inducing portions 450 and fall to the bottom of the sump region 240. The size and orientation of the drag-inducing portions 450 may be determined based on the following equations:

$$t = \frac{w}{v \cos \theta}$$

$$L = \frac{w(V - v \sin \theta)}{v \cos \theta}$$

where w is the settling distance from the inlet aperture to the bottom of the sump region, v is the settling velocity (in/s), θ is the angle of the tubular body from the horizontal plane, and L is the length of the drag-inducing portions, and $$\frac{du_p}{dt} = F_D(u - u_p) + \frac{g_x(\rho_p - \rho)x^2}{\rho_p} + F_x$$

$$F_D = \frac{18u}{\rho_p d_p^2} \frac{C_D R_p}{24}$$

$$R_p = \frac{\rho d_p |u_p - u|}{u}$$

$$C_d = \frac{24}{R_p}$$

where $u_p$ is the particle velocity, u is the fluid velocity, ρ is the fluid density, $\rho_p$ is the particle density, $g_x$ is the gravity, x and $F_x$ are additional forces such as body forces and forces due to pressure gradients, and $F_D$ is the drag force being composed of the liquid molecular velocity μ, the particle diameter $d_p$, the Reynolds number of the particle $R_p$, and the drag coefficient $C_d$.

Figure 9:
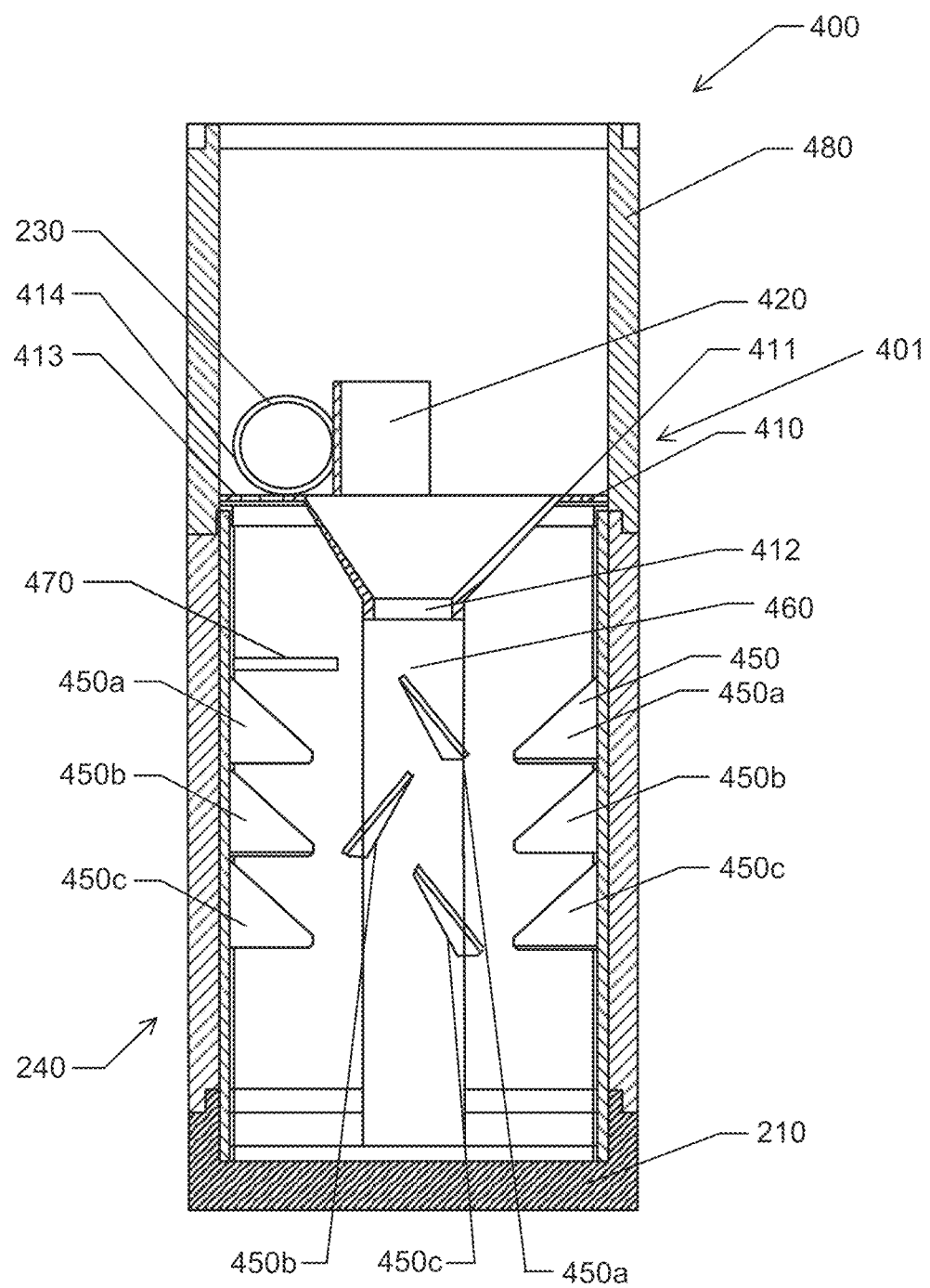
FIG. 9 is an illustration of a cross-sectional view of another exemplary system with a plate positioned above a plurality of drag-inducing portions, consistent with the embodiments of the present disclosure.
Figure 10:
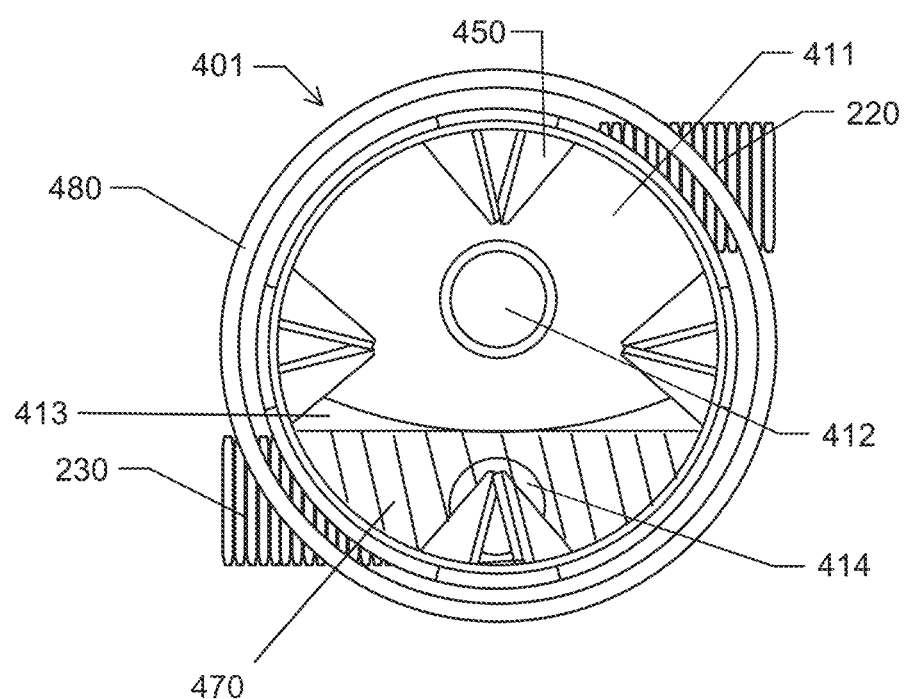
FIG. 10 is an illustration of a bottom view of the exemplary system of FIG. 9, consistent with the embodiments of the present disclosure.
Figure 11:
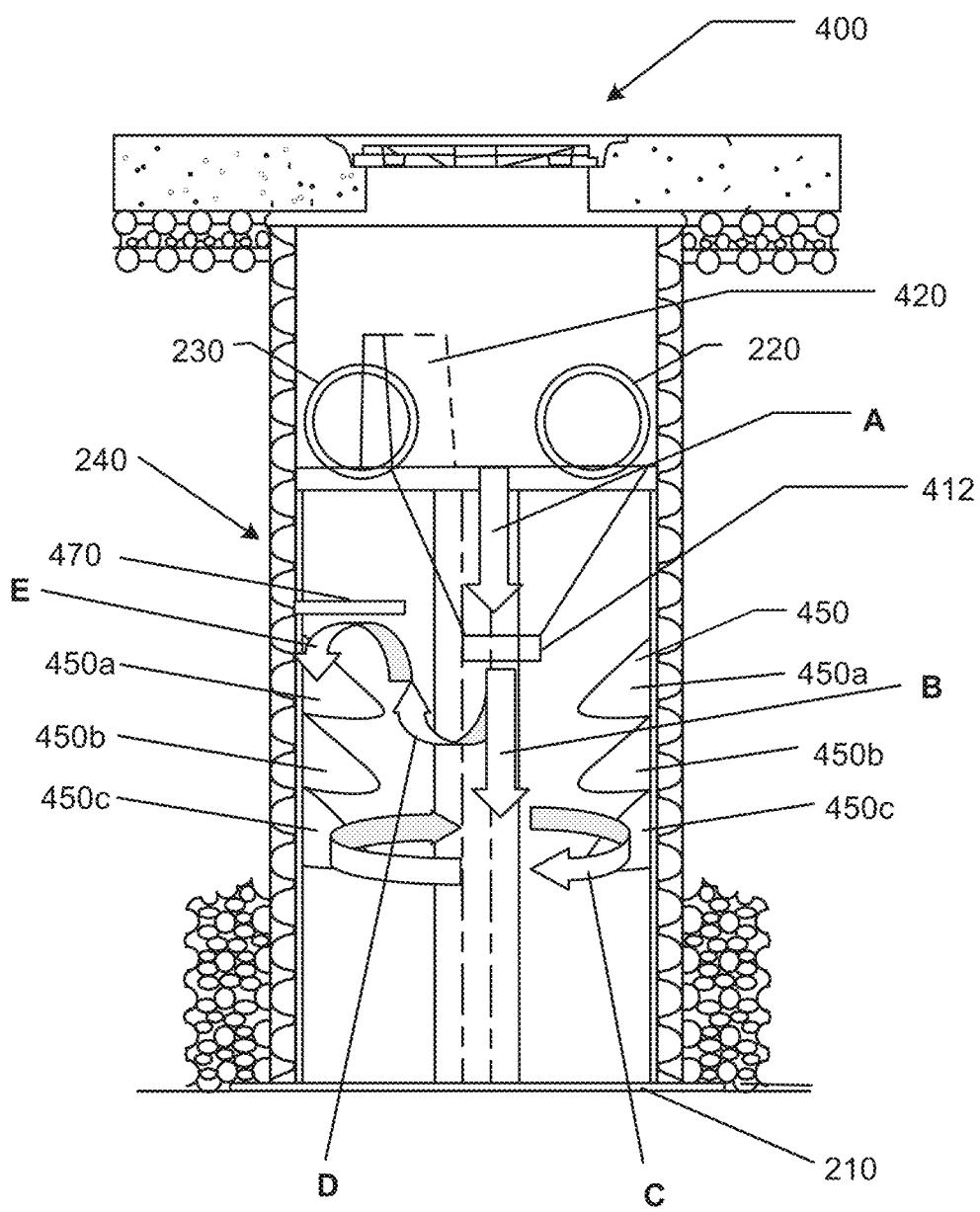
FIG. 11 is an illustration of a sequence showing how fluid flows through the exemplary system of FIG. 9, consistent with the embodiments of the present disclosure.

In some embodiments, the system for removing particulates from liquid may further comprise a plate configured to prevent short-circuiting of the flow of liquid. Referring to FIGS. 9-11, for example, system 400 may further comprise a plate 470 positioned in the sump region 240 between the liquid quality device 401 and the plurality of drag-inducing portions 450. When liquid, such as stormwater runoff, enters into the sump region 240 via sump inlet aperture 412 and interacts with the plurality of drag-inducing portions 450, a vortex is created, which allows particulates in the liquid to fall out of the vortex and into the bottom of the sump region 240 before the liquid exits the system 400. However, a portion of the liquid flow may never reach the plurality of drag-inducing portions 450 in the sump region 450, but instead, exit the system 400 without liquid treatment. Accordingly, in order to ensure that the liquid flow reaches the plurality of drag-inducing portions 450 in the sump region 450 and prevent the liquid from exiting the system 400 without treatment, a plate 470 may be positioned above the plurality of drag-inducing portions 450. The plate 470 may be configured to direct the liquid flow to the plurality of drag-inducing portions 450, thereby eliminating flow pathways for short-circuiting.

As seen in FIGS. 9 and 10, the plate 470 may comprise a substantially horizontal plate positioned below the sump inlet aperture 412 and above the plurality of drag-inducing portions 450. The plate 470 may be formed of a material, such as polyethylene, polypropylene, or other thermoplastics, or metals, such as stainless steel or aluminum, or fiberglass. In some embodiments, the plate 470 may be between about 5 inches and about 20 inches wide. For example, the plate 470 may be about 15 inches wide. While FIGS. 9 and 10 illustrate one plate 470 positioned in the sump region 240, the embodiments of the present disclosure are not limited thereto. For example, system 400 may comprise a plurality of plates 470 positioned above the drag-inducing portions 450 in the sump region 240, such as two, three, or four plates 470. In some embodiments, the number of plates 470 in the sump region 240 may be the same as the number of sets of drag-inducing portions 450 in the sump region 240. By way of example, if there are four sets of drag-inducing portions 450 in the sump region 240, system 400 may comprise four plates 470, one above each set of drag-inducing portions 450.

FIG. 11 illustrates an exemplary sequence showing how liquid flows through system 400, consistent with the embodiments of the present disclosure. At step A, liquid comprising suspended particulates may enter into the funnel of the liquid quality device, and the funnel, together with the weir 420, may induce the liquid into a vortex. At step B, the liquid may pass through the liquid quality device via sump inlet aperture 412 and into the sump region 240. At step C, the liquid propagates into the sump region 240 in a generally horizontal direction, as shown by the arrows. Once the liquid passes into the sump region 240, the vortex action may be reduced through detention time and energy losses, partly due to the plurality of drag-inducing portions 450 (drag-inducing portions 450a, 450b, 450c, as shown in FIG. 11), thereby allowing smaller particulates that were not removed through the cyclonic action of the vortex in the funnel to settle out of the liquid and into the bottom of the sump region 240. At step D, however, some of the liquid flow may try to exit the sump region 240 without reaching the plurality of drag-inducing portions 450 (i.e., short-circuiting). Accordingly, the plate 470 may be positioned above the plurality of drag-inducing portions 450 in the sump region 240 in order to direct the liquid flow trying to exit the sump region 240. For example, at step E, some of the liquid flow trying to exit the sump region 240 may be directed back towards the plurality of drag-inducing portions 450 in the sump region 240 by the plate 470. Therefore, the plate 470 may ensure that the liquid does not exit the system 400 without treatment to remove particulates from the liquid.

Figure 12:
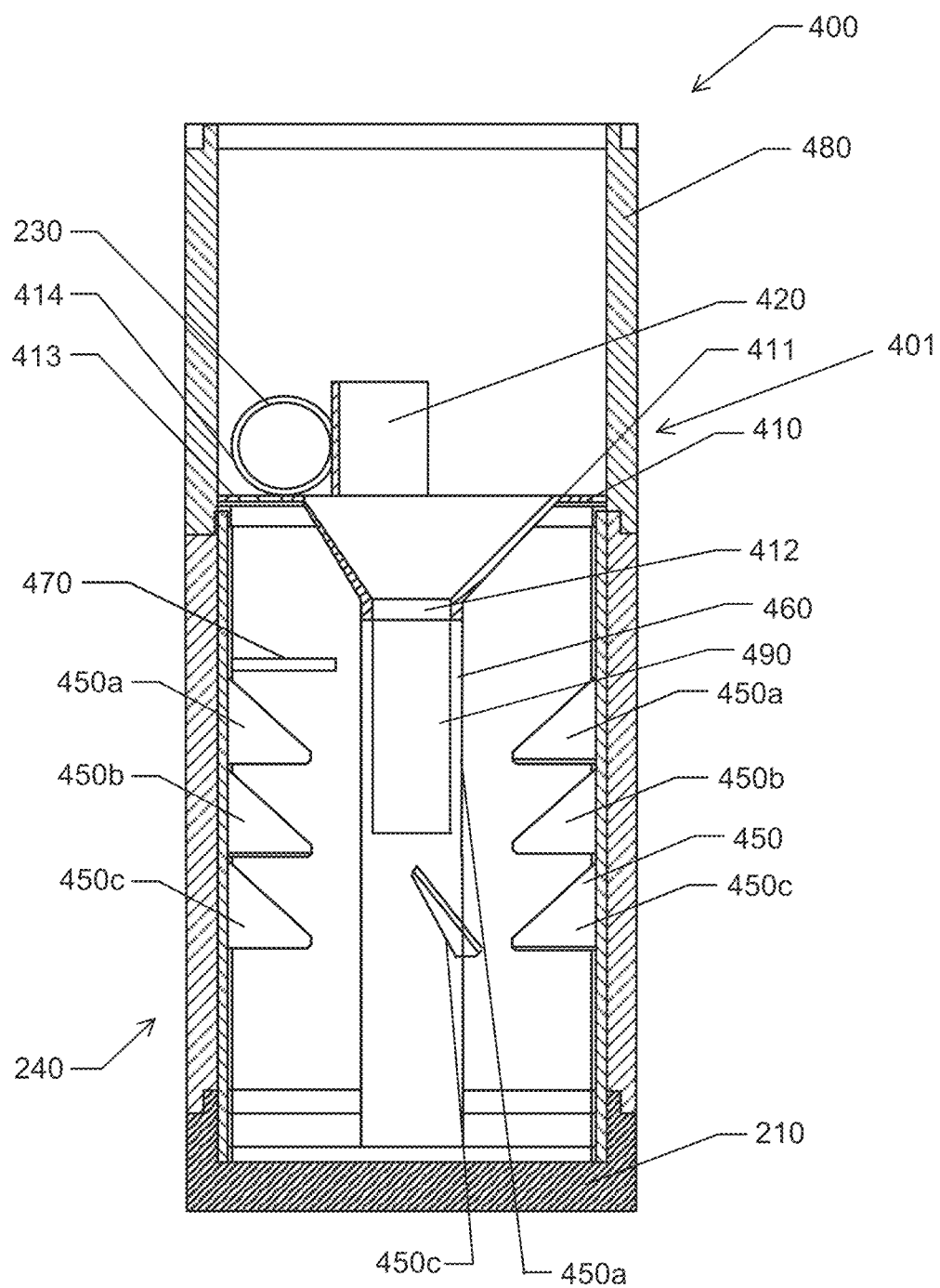
FIG. 12 is an illustration of a cross-sectional view of another exemplary system with a plate positioned above a plurality of drag-inducing portions and a tube, consistent with the embodiments of the present disclosure.
Figure 13:
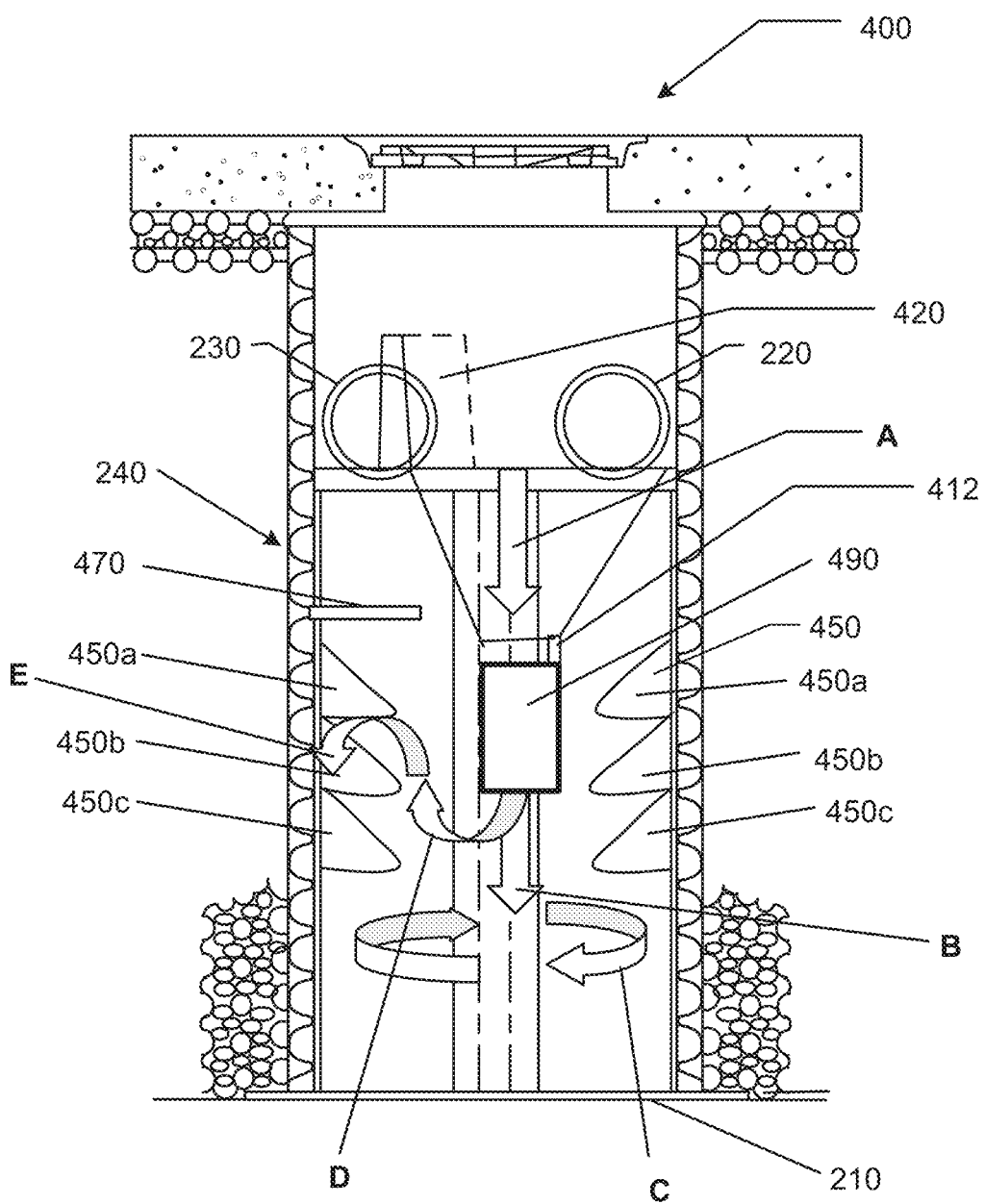
FIG. 13 is an illustration of a sequence showing how fluid flows through the exemplary system of FIG. 12, consistent with the embodiments of the present disclosure.

In some embodiments, the system for removing particulates from liquid may further comprise a tube to prevent short-circuiting of the flow of liquid. Referring to FIGS. 12 and 13, for example, system 400 may further comprise a tube 490 positioned below the sump inlet aperture 412, and the tube 490 may extend downwardly from the sump inlet aperture 412 into the sump region 240. For example, the tube 490 may extend between about 2 inches and about 20 inches downwardly from the sump inlet aperture 412. In some embodiments, the tube 490 may extend between about 12 inches and about 20 inches downwardly from the sump inlet aperture 412. The tube 490 may be formed of a material, such as polyethylene, polypropylene, or other thermoplastics, metals, such as stainless steel or aluminum, or fiberglass.

When liquid, such as stormwater runoff, enters through the sump inlet aperture 412, the tube 490 may direct the incoming flow of liquid deeper into the sump region 240, thereby reducing or eliminating lateral movement of the liquid. Accordingly, the tube 490 may direct the liquid flow deeper into the plurality of drag-inducing portions 450 (drag-inducing portions 450a, 450b, and 450c depicted in FIG. 12) in the sump region 240. By directing the liquid deeper into the plurality of drag-inducing portions 450, the tube 490 may ensure that the liquid interacts with the plurality of drag-inducing portions 450 for treatment to remove particulates from the liquid before exiting the system 400, thereby eliminating flow pathways for short-circuiting. As shown in FIG. 12, the system 400 may comprise both the plate 470 and the tube 490 to eliminate liquid flow pathways for short-circuiting and ensure that the liquid receives treatment for removing particulates therein before exiting the system 400. In other embodiments, the system 400 may comprise only the plate 470 or only the tube 490.

FIG. 13 illustrates an exemplary sequence showing how liquid flows through system 400, consistent with the embodiments of the present disclosure. At step A, liquid comprising suspended particulates may enter flow into the funnel of the liquid quality device, and the funnel, together with the weir 420, may induce the liquid into a vortex. At step B, the liquid may pass through the liquid quality device via sump inlet aperture 412 and tube 490 and deeper into the sump region 240. At step C, the liquid propagates into the sump region 240 in the general direction shown by the arrows. Once the liquid passes into the sump region 240, the vortex action may be reduced through detention time and energy losses, partly due to the plurality of drag-inducing portions 450, thereby allowing smaller particulates that were not removed through the cyclonic action of the vortex in the funnel to settle out of the liquid and into the bottom of the sump region 240. At step D, however, some of the liquid flow may try to exit the sump region 240 without reaching the plurality of drag-inducing portions 450 (i.e., short-circuiting). Accordingly, the plate 470 may be positioned above the plurality of drag-inducing portions 450 (drag-inducing portions 450a, 450b, and 450c depicted in FIG. 13) in the sump region 240 in order to direct the liquid flow trying to exit the sump region 240. For example, at step E, some of the liquid flow trying to exit the sump region 240 may be directed back towards the plurality of drag-inducing portions 450 in the sump region 240 by the plate 470. Therefore, the tube 490 and the plate 470 may further ensure that the liquid does not exit the system 400 without treatment to remove particulates from the liquid.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system for removing particulates from liquid and inducing drag in a liquid flow, wherein the system is configured for insertion into a manhole thereby creating a sump region below the system, wherein the system comprises:
   a liquid quality device comprising:
      a first region having a funnel with a sump inlet aperture;
      a second region having a sump outlet aperture;
      a weir positioned between the first region and the second region;
   a plurality of drag-inducing portions located below the liquid quality device and projecting inwardly towards a central axis of the sump region, wherein the plurality of drag-inducing portions comprise at least:
      a first set of drag-inducing portions;
      a second set of drag-inducing portions;
      a third set of drag-inducing portions; and
      wherein each of the first, second, and third, sets of drag-inducing portions are positioned equidistant from each other and at a same height around a perimeter of the sump region; and
   a plate positioned in the sump region between the liquid quality device and the plurality of drag-inducing portions wherein the plate projects inwardly toward the central axis of the sump region;
   wherein the funnel in the first region, the weir, and the plurality of drag-inducing portions are integrated and formed into a single piece.

2. The system of claim 1, wherein:
   the liquid quality device further comprises a fourth set of drag-inducing portions; and
   wherein the first, second, third, and fourth sets of drag-inducing portions are positioned equidistant from each other and at a same height around a perimeter of the sump region.

3. The system of claim 1, wherein at least one of the first, second, or third sets of drag-inducing portions further comprises:
   a first tooth;
   a second tooth located below the second tooth; and
   a third tooth located below the second tooth.

4. The system of claim 3, wherein teeth of the first set of drag-inducing portions are positioned in a different orientation than teeth of the second set of drag-inducing portions.

5. The system of claim 1, wherein the plate projects inwardly toward the central axis of the sump region such that the plate partially covers a horizontal cross-sectional area of the sump region.

6. The system of claim 1, further comprising:
   a tube positioned below the sump inlet aperture, wherein the tube extends downwardly from the sump inlet aperture into the sump region.

7. The system of claim 1, wherein:
the first region is configured to receive a flow of liquid from the inlet of the manhole and transfer the flow of liquid through the sump inlet aperture of the funnel and into the sump region, and
the second region is configured to receive the flow of liquid from the sump region through the sump outlet aperture and transfer the flow of liquid to the outlet of the manhole.

8. The system of claim 1, wherein the weir comprises a constant curvature along a horizontal dimension.

9. The system of claim 1, wherein the weir comprises a varying curvature along a horizontal dimension.

10. The system of claim 1, wherein the liquid quality device further comprises a clean-out riser pipe extending upwardly from a clean-out aperture in the second region.

11. The system of claim 1, further comprising a plurality of supporting portions, wherein the funnel in the first region, the weir, the supporting portions, and the plurality of drag-inducing portions are integrated and formed into a single piece.

12. The system of claim 1, wherein the plate further comprises a plurality of plates, each of the plurality of plates being positioned above each of the plurality of sets of drag-inducing portions.

13. A system for removing particulates from liquid and inducing drag in a liquid flow, wherein the system is configured for insertion into a manhole thereby creating a sump region below the system, wherein the system comprises:
a liquid quality device comprising:
a first region having a funnel with a sump inlet aperture;
a second region having a sump outlet aperture;
a weir positioned between the first region and the second region;
a plurality of drag-inducing portions located below the liquid quality device and projecting inwardly towards a central axis of the sump region, wherein the plurality of drag-inducing portions comprise:
a first set of drag-inducing portions;
a second set of drag-inducing portions;
a third set of drag-inducing portions; and
a fourth set of drag-inducing portions, wherein the first, second, third, and fourth sets of drag-inducing portions are positioned equidistant from each other and at a same height around a perimeter of the sump region;
a plate positioned in the sump region between the liquid quality device and the plurality of drag-inducing portions wherein the plate projects inwardly toward the central axis of the sump region; and
a tube positioned below the sump inlet aperture, wherein the tube extends downwardly from the sump inlet aperture into the sump region;
wherein the funnel in the first region, the weir, and the plurality of drag-inducing portions are integrated and formed into a single piece.

14. The system of claim 13, wherein at least one of the first, second, or third sets of drag-inducing portions further comprises:
a first tooth;
a second tooth located below the second tooth; and a third tooth located below the second tooth.

15. The system of claim 14, wherein teeth of the first set of drag-inducing portions are positioned in a different orientation than teeth of the second set of drag-inducing portions.

16. The system of claim 13, wherein the plate projects inwardly toward the central axis of the sump region such that the plate partially covers a horizontal cross-sectional area of the sump region.

17. The system of claim 13, wherein:
the first region is configured to receive a flow of liquid from the inlet of the manhole and transfer the flow of liquid through the sump inlet aperture of the funnel and into the sump region, and
the second region is configured to receive the flow of liquid from the sump region through the sump outlet aperture and transfer the flow of liquid to the outlet of the manhole.

18. The system of claim 13, wherein the liquid quality device further comprises a clean-out riser pipe extending upwardly from a clean-out aperture in the second region.

19. The system of claim 13, further comprising a plurality of supporting portions, wherein the funnel in the first region, the weir, the supporting portions, and the plurality of drag-inducing portions are integrated and formed into a single piece.

20. The system of claim 13, wherein the weir comprises a constant curvature along a horizontal dimension.

21. The system of claim 13, wherein the weir comprises a varying curvature along a horizontal dimension.

22. The system of claim 13, wherein an orientation and an angle of the at least one drag-inducing portions are adjustable.

* * * * *